(12) United States Patent
LeProwse et al.

(10) Patent No.: US 7,831,850 B2
(45) Date of Patent: Nov. 9, 2010

(54) HYBRID OPERATING SYSTEMS FOR BATTERY POWERED COMPUTING SYSTEMS

(75) Inventors: Shawn R. LeProwse, Mercer Island, WA (US); Erik M. Geidl, Moscow, ID (US); Andrew J. Fuller, Redmond, WA (US); Gregory H. Parks, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 11/693,659

(22) Filed: Mar. 29, 2007

(65) Prior Publication Data

US 2008/0244289 A1 Oct. 2, 2008

(51) Int. Cl.
*G06F 1/32* (2006.01)
(52) U.S. Cl. .......................................... 713/320; 713/1
(58) Field of Classification Search ............... 713/1, 713/320
See application file for complete search history.

(56) References Cited

U.S. PATENT DOCUMENTS

| | | | | |
|---|---|---|---|---|
| 5,142,684 A * | 8/1992 | Perry et al. | ............... | 713/320 |
| 5,878,264 A * | 3/1999 | Ebrahim | ................... | 713/323 |
| 6,049,854 A | 4/2000 | Bedarida | | |
| 6,101,608 A * | 8/2000 | Schmidt et al. | ................ | 726/2 |
| 6,240,521 B1 * | 5/2001 | Barber et al. | ............... | 713/323 |
| 6,366,957 B1 * | 4/2002 | Na | ............................. | 709/229 |
| 6,367,074 B1 * | 4/2002 | Bates et al. | ................ | 711/170 |
| 6,493,824 B1 * | 12/2002 | Novoa et al. | ............... | 713/162 |
| 6,501,999 B1 * | 12/2002 | Cai | ............................. | 700/82 |
| 6,631,469 B1 * | 10/2003 | Silvester | ....................... | 713/2 |
| 6,836,850 B2 * | 12/2004 | Cheng | ........................ | 713/324 |
| 6,839,836 B2 * | 1/2005 | Cole et al. | ..................... | 713/2 |
| 6,922,788 B2 | 7/2005 | Eberhard et al. | | |
| 6,976,180 B2 | 12/2005 | Cupps et al. | | |
| 7,343,484 B2 * | 3/2008 | Du et al. | ......................... | 713/2 |
| 7,421,602 B2 * | 9/2008 | Sutardja | ....................... | 713/324 |
| 7,552,349 B2 * | 6/2009 | Hassan et al. | ................ | 713/320 |
| 2002/0152372 A1 | 10/2002 | Cole et al. | | |
| 2004/0162466 A1 | 8/2004 | Quy | | |
| 2004/0217937 A1 | 11/2004 | Moskalik et al. | | |

(Continued)

FOREIGN PATENT DOCUMENTS

WO WO2004027609 A1 4/2004

OTHER PUBLICATIONS

Kumar, et al., "Processor Power Reduction Via Single-ISA Heterogeneous Multi-Core Architectures", Mar. 2003, pp. 1-4.

(Continued)

*Primary Examiner*—Chun Cao
(74) *Attorney, Agent, or Firm*—Lee & Hayes, PLLC

(57) ABSTRACT

Systems, methods, and/or techniques ("tools") for hybrid operating systems for battery powered computing systems are described herein. The hybrid operating systems (OS) may include a full-power OS component that enables the computing system to operate in a full-power mode, and a low-power OS component that enables the computing system to operate in a low-power mode. In the full-power mode, the computing system consumes a first amount of electrical power, while in the low-power mode, the computing system consumes less electrical power. The computing system may include a processor that consumes a given power amount of power, and a low-power core processor that consumes less power than the processor.

17 Claims, 4 Drawing Sheets

U.S. PATENT DOCUMENTS

| | | |
|---|---|---|
| 2005/0188374 A1 | 8/2005 | Magenheimer |
| 2006/0112287 A1* | 5/2006 | Paljug ........................ 713/300 |
| 2007/0067655 A1* | 3/2007 | Shuster ....................... 713/300 |
| 2007/0113066 A1* | 5/2007 | Samba et al. .................. 713/1 |

OTHER PUBLICATIONS

"Dualor Technologies Previews New Handtop PC", retrieved on Sep. 4, 2006, at <<http://www.dualcor.com/010406press.php>>, DualCor Technologies, Inc., Jan. 4, 2006, pp. 01.

Paul, et al., "Benchmark-Based Design Strategies for Single Chip Heterogeneous Multiprocessors", retrieved at <<http://portal.acm.org/citation.cfm?id=1016736&jmp=abstract&coll=ACM&dl=ACM&CFID=935764&CFTOKEN=95795627#abstract>>, CODES+ISSS'04, Sep. 8-10, 2004, ACM, pp. 54-59.

Pering, et al., "CoolSpots: Reducing the Power Consumption of Wireless Mobile Devices with Multiple Radio Interfaces", retrieved at <<http://delivery.acm.org/10.1145/1140000/1134704/p220-pering.pdf?key1=1134704&key2=3935637511&coll=ACM&dl=ACM& CFID=15151515&CFTOKEN=6184618>>, Mobisys'06, Jun. 19-22, 2006, ACM, pp. 220-232.

* cited by examiner

HYBRID OPERATING SYSTEMS FOR BATTERY POWERED COMPUTING SYSTEMS

BACKGROUND

Laptop computer users are often frustrated by short battery life when they are operating their computers only on battery power. If these users keep their laptops tethered to AC power outlets, this constraint may remove some of the flexibility and mobility that make laptops attractive as workplace and home tools.

SUMMARY

Systems, methods, and/or techniques ("tools") for hybrid operating systems for battery powered computing systems are described herein. The hybrid operating systems (OS) may include a fill power OS component that enables the mobile computing system to operate in a full power mode, and a low-power OS component that enables the computing system to operate in a low-power mode. In the full power mode, the mobile computing system consumes a normal amount of electrical power. In the low-power mode, the computing system consumes less electrical power. The computing system may include a first processor that consumes a given power amount of power, and a second processor that consumes less power than the first processor.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to hybrid operating systems for battery powered computing systems are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools provide hybrid operating systems for battery powered computing systems. This discussion also describes other techniques and/or processes that the tools may perform.

Figure 1:
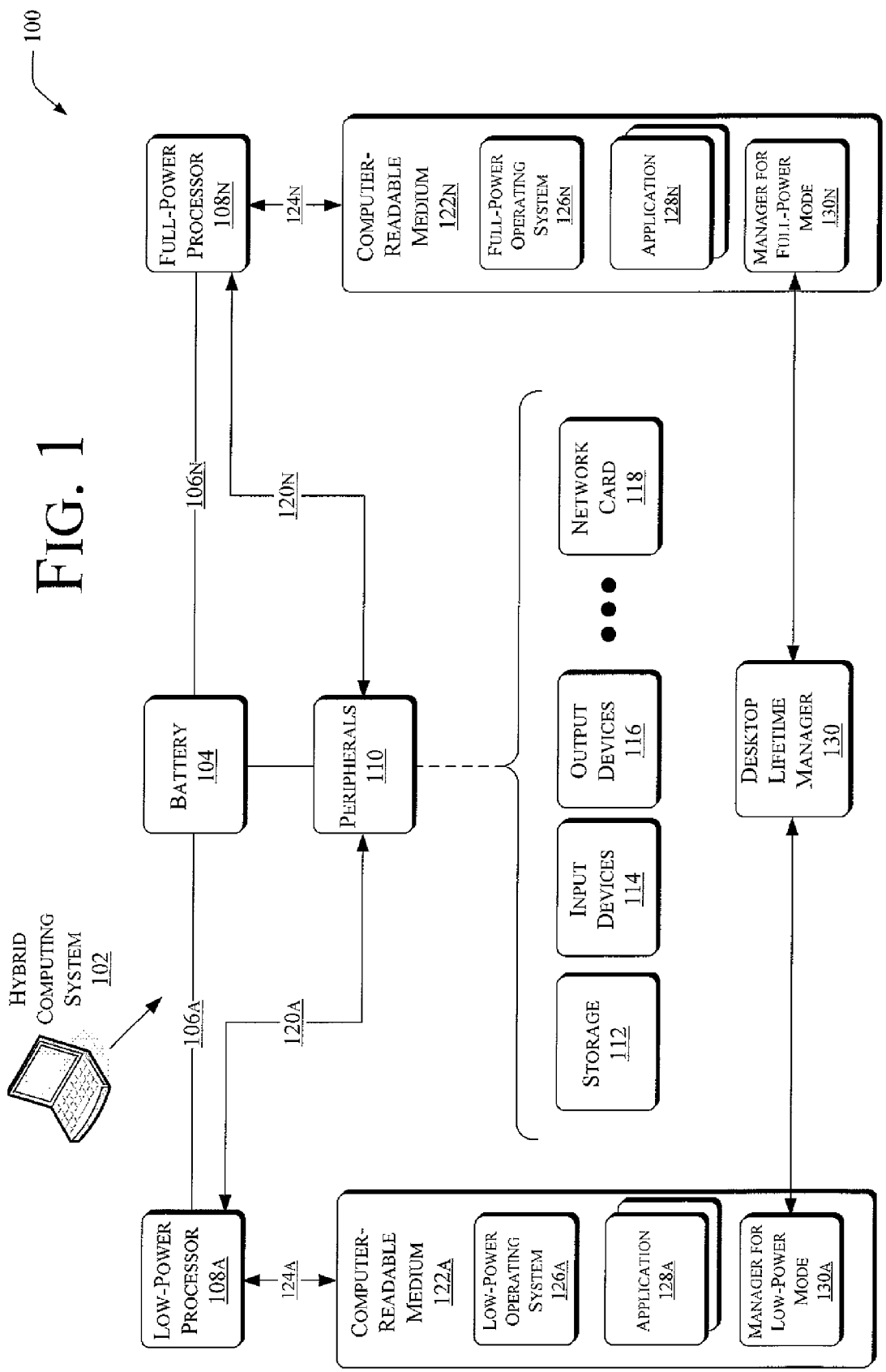
FIG. 1 is a block diagram illustrating environments in which tools for hybrid operating systems for battery powered computing systems may operate.

FIG. 1 illustrates example environments 100 in which the tools for hybrid operating systems for battery powered computing systems may operate. These operating environments 100 may include one or more computing systems 102, which are depicted as shown in FIG. 1 for example only, but not limitation. These display devices could also take the form of laptop computing systems, or other mobile computing systems, for example.

The computing systems 102 may include one or more battery units 104 that may be charged from an AC power supply (not shown), and then used to power the computing systems when these systems are not connected to AC power. More specifically, these battery units may supply DC power to various components of the computing systems 102, as represented by the lines 106a, 106b, and 106n in FIG. 1.

The computing systems 102 may be computer-based systems that include one or more processors, denoted generally at 108. These processors may also be categorized or characterized as having a given type or architecture, but may or may not have the same type or architecture.

The operating environments 100 may include at least two different processors, denoted at 108a and 108n, that exhibit different electrical power consumption characteristics. Additionally, these processors may exhibit different processing capabilities as well. In the non-limiting example shown in FIG. 1, the processor 108a may consume less power than the processor 108n. It is noted that the two processors 108 may be different processors altogether, or may be separate cores within the same processor. These processors may also be characterized as having different architectures (e.g., X86, ARM, or other examples).

The processor 108a may receive electrical power from the battery 104, as indicated by the line 106a. Likewise, the processor 108n may receive electrical power from the battery 104, as indicated by the line 106n.

The processors 108 may communicate with a plurality of different peripherals, with FIG. 1 denoting the peripherals generally at 110. The peripherals 110 may include storage devices 112 for storing programs and/or data. These storage devices may include disk drives and/or solid state memory, such as any convenient form of RAM, flash memory, or the like.

Input devices 114 may capture input from one or more users and persist it for processing, with this input including manual or verbal forms. More specifically, the input devices 114 may include keyboards, input mice, pen input devices (e.g., a stylus) or other pointing devices, microphones and software for processing speech input, and the like. Input devices may also include components for recognizing user gestures, recognizing chemical signatures, detecting motion, or the like.

Output devices 116 may provide output to the users, in visual and/or audio form. For example, the output devices 116 may include displays or monitors for presenting images, documents, or video. The output devices 116 may also include speakers for providing audio output. A network interface card 118 may enable the computing systems to communicate with one or more networks, and may include wired adapters, wireless radio devices, and any related software. Output devices may include components for producing tactile output, audible speech, or electrical stimulation, as well as actuating robotic components, or the like.

The peripherals 110 and the processors 108 may communicate via bus interface systems, denoted generally by the lines 120. More specifically, a bus interface system 120a may couple the processor 108a and the peripherals 110, and a bus interface system 120n may couple the processor 108n and the peripherals 110. It is noted that some peripherals may communicate with the processors via different interface types, and that the lines 120 may represent a plurality of different interfaces. As non-limiting examples, hard drives may communicate via a serial advanced technology attachment (SATA) interface, while other devices (e.g., keyboards, mice, flash memory devices, and the like) may communicate via a Universal Serial Bus (USB) interface, and video displays may communicate via a low voltage differential signaling (LVDS) interface. These examples are provided for convenience only, and not to limit possible implementations.

The peripherals 110 may receive electrical power from the battery 104, as represented by the line 106b. Additionally, as detailed further below, in some implementations, some of the peripherals 110 may be operable in different power-consumption modes, possibly trading-off some level of performance capability in exchange for lengthening the life of the battery 104 before recharging. In other implementations, the computing systems may include separate high and low power peripherals, with high power peripherals made available to the processor 108n, and the low power peripherals made available to the processor 108a.

The computing systems 102 may operate in at least two modes: a low-power mode in which the processor 108a may execute, and a high-power mode in which the processor 108n may execute. Generally speaking, the low-power mode of the computing system may consume less power from the battery, thus extending battery life while trading off some performance capabilities. Without limiting possible implementations, the low-power mode may be associated with using the system in a mobile mode. The high-power mode of the computing system may deliver the full performance capabilities of the system, while trading shortened battery life. Thus, the computing systems are described herein as "hybrid" systems, as now detailed further.

The processors 108 may be respectively associated with instances of computer-readable storage media, denoted generally at 122. More specifically, the processor 108a may communicate with computer-readable storage media 122a via one or more bus systems 124a, while the processor 108n may communicate with computer-readable storage media 122n via one or more bus systems 124n. The bus systems, denoted collectively at 124 herein, may be implemented using any bus architectures that are appropriate in possible applications, as recognized by those skilled in the art. The computer-readable storage media may be implemented, at least in part, using the storage elements 112.

Turning to the computer-readable storage media 122a in more detail, it may include an instance of an operating system, denoted at 126a, that the computing system executes when in a low-power consumption mode. A non-limiting example of such an operating system is the WINDOWS® CE operating system, provided by Microsoft Corporation of Redmond, Wash. Other examples of the operating systems 126a may include operating systems that are suitable for executing on, for example, handheld computing devices that run primarily on battery power.

The computer-readable storage media 122a may include one or more applications, denoted at 128a. The applications 128a may include applications that are specialized to run under the operating system 126a. The applications 128a may include "light" versions of Internet browsing software, document viewers, contact management systems, e-mailing applications, calendar applications, word processors, spreadsheets, or the like.

Turning to the computer-readable medium 122n, it may include an instance of an operating system, denoted at 126n. The operating system 126n may include a full power operating system that offers full functional capabilities. Examples of such operating systems may include any of the WINDOWS® family of operating systems, available from Microsoft Corporation of Redmond, Wash. (e.g., WINDOWS® XP, WINDOWS VISTA™, or the like.

In some implementations, the low-power operating system 126a may be a subset of the full-power operating system 126n. In some cases, these two operating systems may be the same operating system, with the low-power portion executing at all times with a set of core functions. The non-core functions may be dormant when the operating system is running in low-power mode. When the system requests capabilities beyond these core functions, one or more of the non-core functions may be activated to service those requests. As the requests are satisfied, any activated non-core functions may be deactivated and become dormant once again.

These concepts may be generalized to N processors or cores that are respectively associated with N nested subsets of the operating system, where N is any positive integer. As various functions of these operating system subsets are requested, these subsets may be activated on demand.

The computer-readable medium 122n may also include one or more full power applications 128n. Examples of the full power applications 128n may include full power word processing applications, database applications, spreadsheet applications, financial applications, or the like. Generally, the applications 128a are designed to run in a more minimalist environment, as compared to the applications 128n.

A lifetime manager application, denoted generally at 130, may be distributed across the computer-readable media 122a and 122n, with a component 130a being stored on the computer-readable media 122a, and a component 130n being stored on the computer-readable media 122n. The lifetime manager application may control sleep, wake, hibernate, network wake, and display functions. As detailed further below in FIG. 2, the lifetime manager application may provide software instructions that control the power-consumption state in which the computing system operates. More specifically, the lifetime manager application may activate either the processor 108a and related peripherals or the processor 108n and related peripherals as appropriate, depending on battery conditions, user selection, or other factors as described below.

Figure 2:
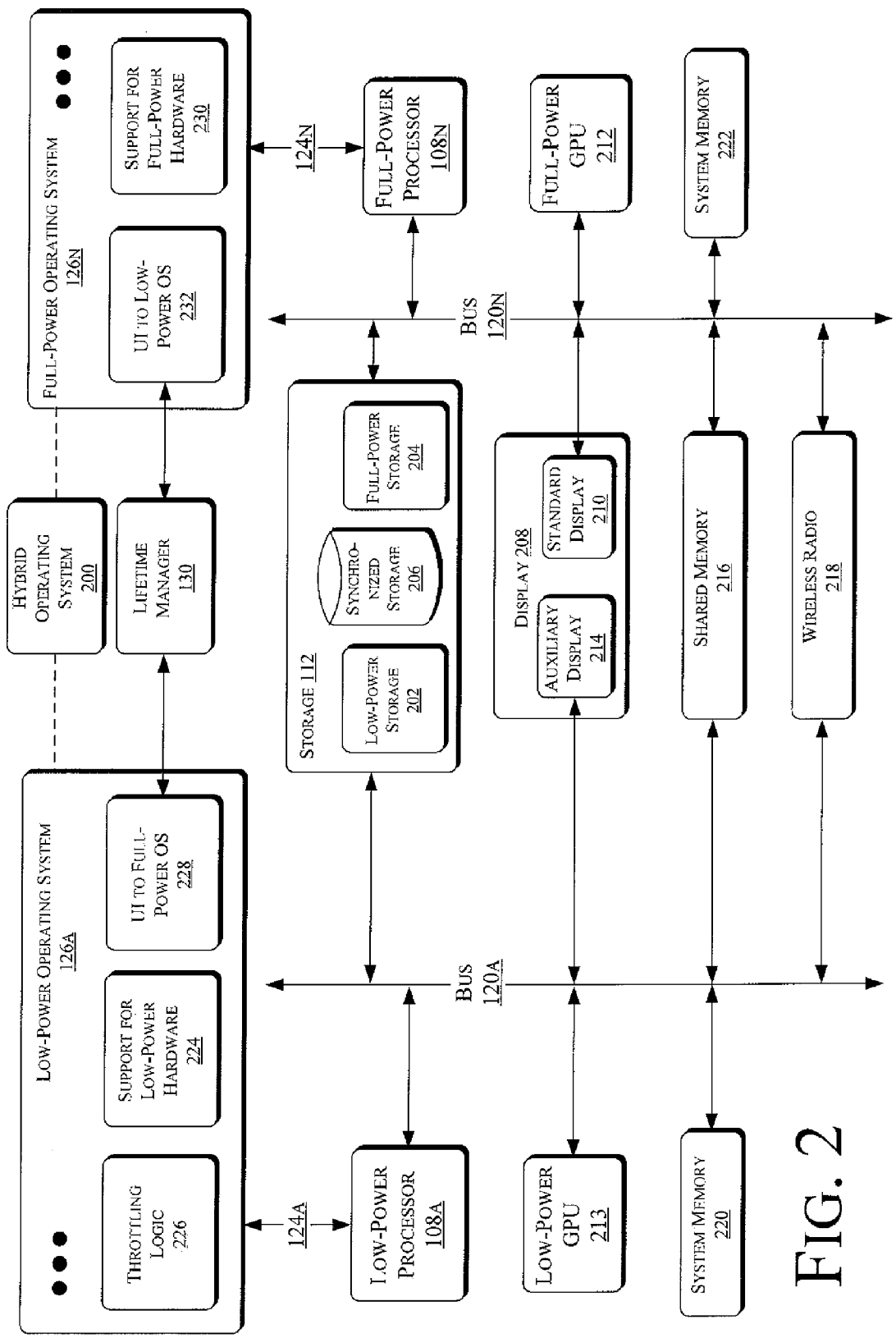
FIG. 2 is a block diagram illustrating the hybrid operating system, as it may execute in the computing systems shown in FIG. 1.

Having described the operating environments 100 in FIG. 1, the discussion now turns to a more detailed description of the hybrid operating system as it may execute in the computing system, now presented with FIG. 2.

FIG. 2 illustrates the hybrid operating system, denoted generally at 200, as it may execute in the computing systems shown in FIG. 1. For convenience but not limitation, some elements described previously are carried forward into FIG. 2, and denoted by identical reference numbers.

As shown in FIG. 2, the hybrid operating system 200 may include a mobile operating system, which may be the low-power operating system 126a, carried forward from FIG. 1. The mobile operating system may be loaded into and executed by a mobile core processor, which may be the low-power processor 108a carried forward from FIG. 1. When the mobile computing systems are to be operated in a low-power or mobile mode, the mobile operating system and mobile core processor may be activated.

The hybrid operating system 200 may include a full power operating system, which may be the high-power operating system 126n, carried forward from FIG. 1. The full power operating system may be loaded into and executed by a first processor, which may be the high-power processor 108n carried forward from FIG. 1.

The hybrid operating system 200 may interact with a storage component, an example of which is carried forward as 112 from FIG. 1. The storage component 112 may include a low-power storage component 202 that consumes relatively little electrical power. The storage component 202 may store data primarily for access by the mobile operating system 126a. The low-power storage component 202 may include a solid state memory, for example, or any other technology appropriate for minimizing the power draw from a power source (e.g., the battery 104 in FIG. 1). For example, the low-power storage component 202 may include a hard disk drive that is capable of running in a low-power mode or non-volatile memory like Flash.

The storage component 112 may also include a high-power storage component 204 that consumes more electrical power as compared to the low-power storage 202. The high-power storage component 204 may store data primarily for access by the full power operating system 126n. The high-power storage component 202 may include one or more disk drives, for example, since the power demands of disk drive mechanisms are less of a concern when the full power operating system is executing.

The storage component 112 may also include a synchronization storage element 206 that may coordinate data accesses between the low-power storage component 202 and the high-power storage component 204. Additionally, the synchronization storage element 206 may filter data accesses from the high-power storage component 204 to the low-power storage component 202. For example, data or content may be presented in different formats, depending on whether the data or content is being viewed or played within the full power operating system or the mobile operating system. Additionally, the synchronization component may filter data, settings, and application state between the storage components.

The storage component 112 may include a shared storage component, which is not shown in FIG. 2 in the interests of legibility. The shared storage component may be accessible to both of the processors 108a and 108n. Implementations in which both processor systems use the same file system may include this shared storage component. Additionally, this shared storage component may be included when the operating systems running on the processors are low-power and high-power versions of the same operating system, or when the low-power version of the operating system is a subset of the high-powered operating system.

The hybrid operating system 200 may interact with one or more display elements, denoted generally at 208. More specifically, the display elements 208 may include a standard display 210. This standard display may include any full-size display suitable for a laptop computer, for example. The standard display may be driven by a relatively high-power graphic processing unit (CPU) 212. When the computing systems are in a low-power mode, and are executing the mobile operating system, the standard display 210 may disabled, or placed into a mode in which the standard display 210 consumes less power. Additionally, the GPU 212 may be disabled, and a lower-power GPU 213 enabled.

In some implementations, the display 208 may include a single display that is shared between the full-power and the low-power operating modes. In other implementations, the display elements 208 may include an auxiliary display 214 that consumes less power than the standard display. For example, the mobile operating system may activate the auxiliary display to minimize power drain. The auxiliary display may be separate from, and possibly smaller than, the standard display. Additionally, the auxiliary display may take the form of a single line display, or may provide sufficient space to display one or more status icons. When the computing systems are in a low-power mode, the mobile operating system may activate the auxiliary display in addition to the standard display, or instead of the standard display.

The hybrid operating system 200 may interact with a memory component 216 that is shared between the mobile core processor 108a and the full power processor 108n. The shared memory 216 may include a dual-port RAM, for example. Additionally, the shared memory 216 may provide a mechanism to exchange state information between the processors 108a and 108n, or more generally, between the mobile operating system and the full power operating system. Examples of the state information may include, but are not limited to, state information relating to applications shared between the two operating systems 126a and 126n, configuration settings, user preferences, or the like.

The computing systems may include a wireless radio 218 that may be shared between the mobile operating system and the full power operating system. The wireless radio 218 may be, for example, a radio that conforms to third-generation (3G) standards, or any other suitable standards. When the hybrid operating system goes into a low-power mode and activates the mobile operating system the hybrid operating system may disable the wireless radio 218, or place it in a low-power mode under the control of the mobile operating system. When the hybrid operating system goes into a full power mode and activates the full power operating system, the hybrid operating system may enable the wireless radio 218, or place it in a normal-power mode.

The computing systems may also include one or more system memories that are "private" to the mobile operating system and the full power operating system. The term "private" indicates that these system memories are not shared between the mobile operating system and the fill power operating system. For example, a system memory 220 may be coupled only to the mobile core processor 108a, and a system memory 222 may be coupled only to the full power processor 10n.

The mobile core processor 108a may communicate with various components and peripherals via one or more bus systems 120a, carried forward from FIG. 1. Additionally, the mobile core processor may communicate with the mobile operating system via one or more bus systems 124a, also carried forward from FIG. 1. In different implementations, the bus systems 120a and 124a may or may not be the same bus systems.

Turning to the mobile operating system in more detail, it may include device drivers and other software suitable for supporting the various peripherals and components with which the mobile core processor 108a may interact. FIG. 2 denotes these device drivers generally at 224. Examples of peripherals may include the peripherals 110 shown in FIG. 1, and examples of the components may include the low-power storage element 202, the display elements 208, the memories 220 and 216, and the radio 218 as shown in FIG. 2.

The mobile operating system may include throttling logic 226. In general, the throttling logic may adjust the operating characteristics of various components within the hybrid operating systems in response to changing levels of available battery power. For example, the throttling logic may adjust the display based on remaining battery power.

In implementations that include a single display shared between the dual power modes, the throttling logic may operate the single display in low-power mode or in high-power mode. The low-power display mode may occupy some portion or subset of the entire display area. For example, the low-power display area may occupy a central portion of the display area, a corner of the display area, or a portion of the perimeter of the display area. Power consumption in the display is proportional to the number of pixels that are active in the display area and the area that is backlit, so reducing the active display area and the backlit area reduces power consumption.

In implementations that include separate displays for the low and high-power modes, the throttling logic may seamlessly move a user between the auxiliary display 214 and the standard display 210. For example, the throttling logic may operate by shutting down the standard display when remaining battery power drops below a "low" threshold.

The hybrid operating systems 200 may include, or interact with, user interface (UI) components that cause the computing systems to transition between low-power modes or states and standard full power modes or states. For example, the mobile operating system 126a may include a UI component 228 through which a user may request that the computing system transition from the low-power mode to the standard full power mode.

Turning to the full power operating system 126n, it may include components, denoted generally at 230, that support the peripherals and components activated components with which the full power processor may interact when the computing systems are operating in standard or full power mode. These support components 230 may include, for example, device drivers or other utilities for the peripherals 110, the high-power storage 204, the standard display 210, the memories 216 and 222, and the radio 218.

The full power operating system 126n may also include a UI component 232 through which a user may request that the computing system transition from the standard full power mode to the low-power mode. The UI components 228 and 232 may communicate with the lifetime manager 130, to enable the hybrid operating system 200 to effect the transitions between the full power and low-power states. For example, the hybrid operating system 200 may automatically transition between modes at user-settable battery levels to maximize remaining battery power. In some implementations, the manage components 130a and 130n shown in FIG. 1 may include at least the UI components 228 and 232. These transitions between modes are described in more detail in FIGS. 3 and 4.

Figure 3:
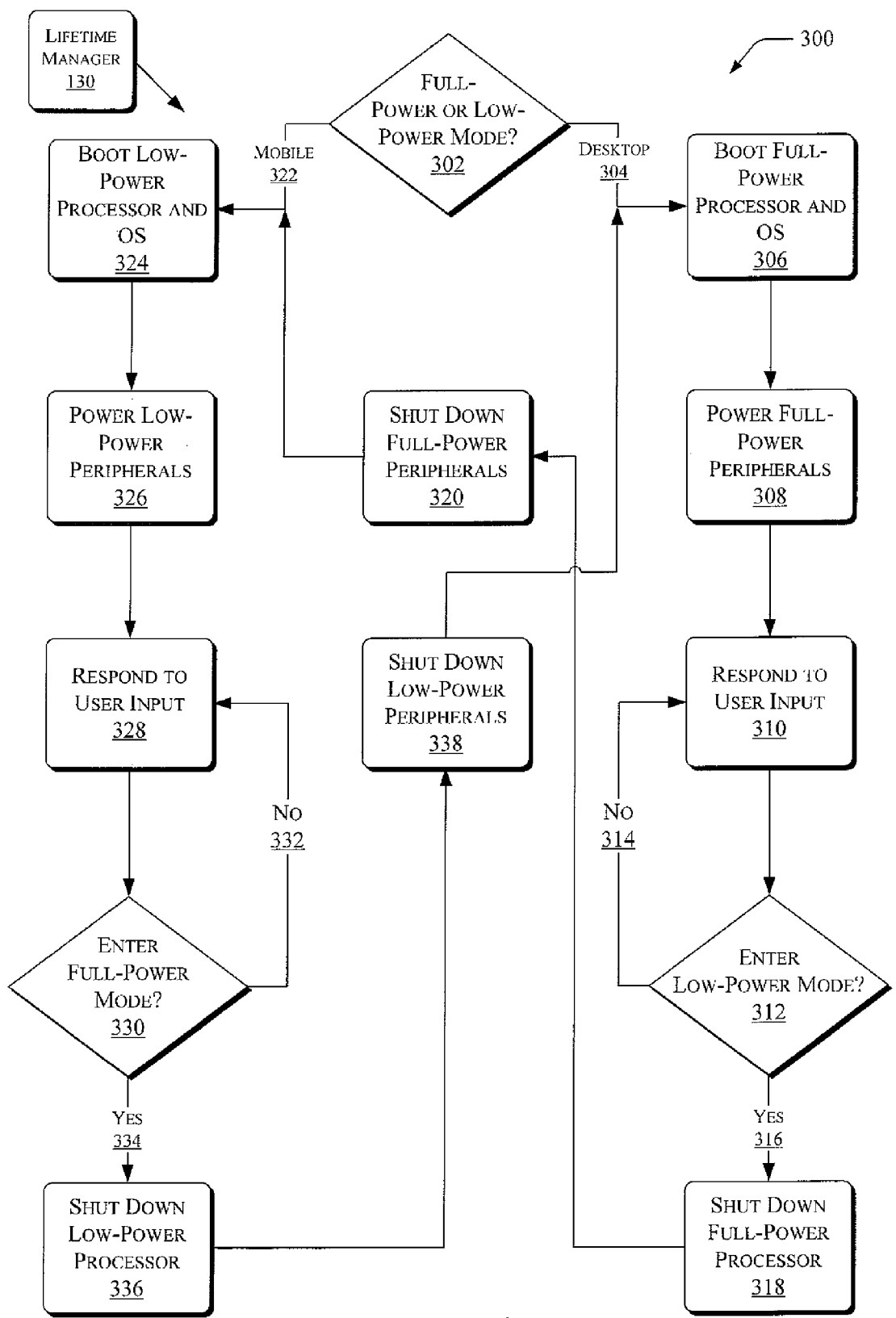
FIG. 3 is a flow diagram of processes for operating the computing systems.

Having described the hybrid operating system as it may execute within the computing system in FIG. 2, the discussion now turns to a more detailed description of process flows for operating the computing systems, now presented with FIG. 3.

FIG. 3 illustrates process flows 300 for operating the computing systems. For convenience but not limitation, some elements described previously are carried forward into FIG. 3, and denoted by identical reference numbers.

For convenience and ease of illustration, the process flows 300 are shown as being performed by the lifetime manager 130. However, at least portions of the process flows 300 may be performed by other components without departing from the scope and spirit of the description herein.

Block 302 represents determining whether to activate the computing system in a standard full power mode or a mobile or low-power mode. The tools may perform block 302 when the computing system is first booted up, for example. If the computing system is to be run in full power mode, the process flows 300 may take branch 304 to block 306, which represents starting or booting a processor to be run while the computing system is in full power mode. FIGS. 1 and 2 provide examples of such processors at 108n. Block 306 may also include booting a full power operating system (e.g. 126n).

Block 308 represents powering or starting any components or peripherals to be accessible to the processor booted in block 306. FIGS. 1 and 2 provide examples of various components or peripherals that may be accessible when the computing system is run in full power mode.

Block 310 represents responding to inputs received from a user. Examples of such inputs may include commands to start applications, data representing information to be entered into such applications, or the like. Block 310 may include receiving and responding to any number of such inputs as users interact with the computing system.

Block 312 represents evaluating whether to transition the computing system from a standard or full power mode to a mobile or low-power mode. If the computing system is to remain in full power mode, the process flows 300 may take No branch 314 back to block 310, in effect continuing the interactions with a user while in full power mode.

Returning to block 312, if the computing system is to transition to mobile mode, then the process flows 300 may take Yes branch 316 to block 318, which represents shutting down the full power processor (e.g., 108n). With the full power processor powered-down, the computing system may conserve power when it is running in mobile mode.

Block 320 represents shutting down or powering off any peripherals or components that are not to be accessible when the computing system is running in mobile mode. Block 320 may include powering-down any peripherals or components whose use may shorten battery life when running in mobile mode.

Returning to block 302, if the computing system is to be started in mobile mode, the process flows 300 may take branch 322 to block 324, which represents booting or starting a mobile processor to run while the computing system is running in mobile mode. FIGS. 1 and 2 show examples of such processors at 108a.

Block 324 may also include booting a mobile operating system (e.g., 126a). In some implementations, the mobile processor and mobile operating system may start and be responsive to user input within a few seconds.

Block 326 represents powering-up or starting any peripherals or components that are to be accessible to the processor booted in block 324. FIGS. 1 and 2 provide examples of various components or peripherals that may be accessible when the computing system is running in mobile mode.

Block 328 represents responding to inputs received from a user. Block 328 may represent similar actions as those discussed with block 310 above. However, block 328 represents performing those actions while the computing system is operating in mobile mode, rather than full power mode. Like block 310, block 328 may include receiving and responding to any numbers of such inputs as users interact with the computing system.

Block 330 represents evaluating whether to transition the computing system from a mobile mode to a full power mode. If the computing system is to remain in mobile mode, the process flows 300 may take No branch 332 to block 328, in effect continuing the interactions with a user while in mobile mode.

Returning to block 330, if the computing system is to transition to a full power mode, the process flows 300 may take Yes branch 334 to block 336, which represents powering-down the mobile processor. When the computing system is running in full power mode, the full power processor (e.g., 108n) is running. Typically, the full power processor is more powerful than the mobile processor, so the mobile processor may be powered down in block 336 without substantially affecting the performance of the full power operating system.

Block 338 represents shutting down or powering-down any components or peripherals provided specially for the mobile mode. Typically, the full power components or peripherals are more powerful than the mobile components or peripherals, so the mobile components or peripherals may be powered down in block 338 without substantially affecting the performance of the full power operating system.

Figure 4:
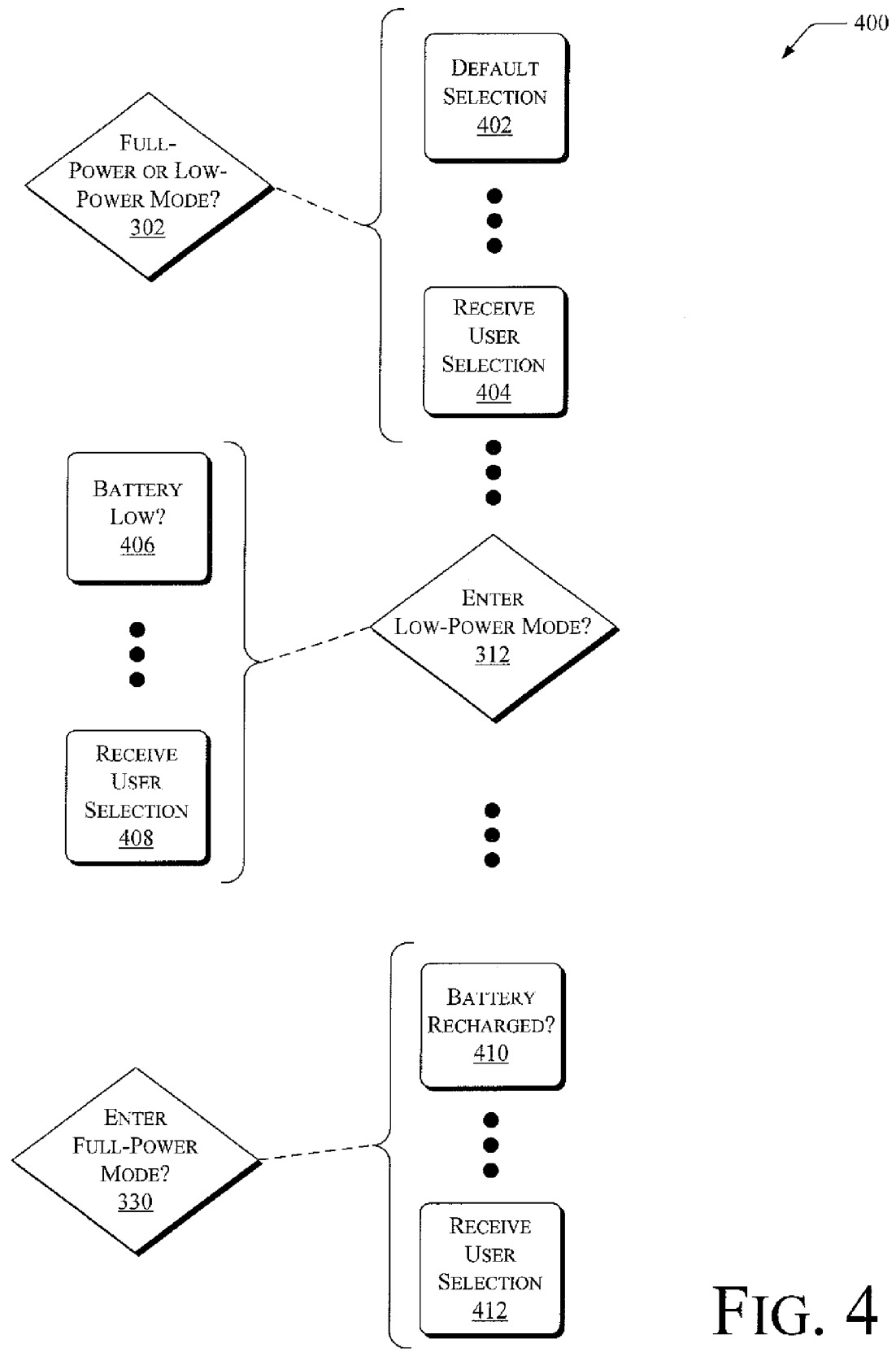
FIG. 4 is a flow diagram of processes for entering a full power mode and a low-power mode provided by the hybrid operating systems.

Having described the process flows for operating the computing systems in FIG. 3, the discussion now turns to a more detailed description of entering the full power mode and the mobile mode, now presented with FIG. 4.

FIG. 4 illustrates process flows 400 for entering the full power mode and the mobile mode. For convenience but not limitation, some elements described previously are carried forward into FIG. 4, and denoted by identical reference numbers.

Block 302 is carried forward from FIG. 3 for further elaboration. As described above, block 302 represents determining whether the computing system is to start in full power mode or mobile mode. As represented in block 402, this choice may be specified as a default by an automated component. For example, a lifetime manager component (e.g., 130 and related components in FIGS. 1 and 2) may specify this default. This default may be altered by a user, such that the computing system will start in the selected default mode, until the user changes the default.

As represented in block 404, a user may select whether the computing system is to start in full power mode or mobile mode, and block 404 may include receiving an indication of such a selection. A suitable user interface may present a form to the user, and enable the user to select the starts mode on a case-by-case basis. Thus, block 404 may include enabling the user to override the default referred to in block 402. In other examples, startup modes may be selected based on battery power remaining, or on the mode that the system was in when last used. As another example, the mode may be selected based on the position of a laptop lid. For example, if the lid is closed, then the system is started in a mobile mode with an auxiliary display. The mode may be selected based on the application being started. For example, if the user wishes to place a cellular telephone call, the system may startup in mobile mode.

In other examples, the mode may also be selected based on what peripherals are connected to the system, based on a location of the system, based on a environment sensed around the system, based on whether the system is connected to AC power, or based on an anticipated usage context. For example, the system may detect whether the user is reading a document, as compared to browsing the Internet. The system may also detect whether the user is accessing the system while riding in a moving vehicle (e.g., using motion sensors), as compared to while sitting at a stationary desk. Additionally, the system may detect whether it is being used in a bright, noisy environment, as compared to a quiet lounge, and configure the display. In any of these examples, the system may select the power consumption mode appropriately for the detected usage or environment.

Block 312 is carried forward from FIG. 3 for further elaboration. As described above, block 312 represents determining whether the computing system is to transition from full power mode to mobile mode. As represented in block 406, the computing system may transition automatically to mobile mode when a power source (e.g., battery 104) reaches some level of discharge. For example, a lifetime manager component (e.g., 130 and related components in FIGS. 1 and 2) may specify a battery level at which the transition to mobile mode occurs. In some cases, a user may alter or specify this battery level, such that the computing system would transition automatically to mobile mode at the specified battery level.

As represented at block 408, the user may affirmatively select when to transition the computing system from fill power mode to mobile mode, and block 408 may include receiving an indication of such a selection. For example, the lifetime manager may present a UI device to the user when the computing system is running in full power mode, with the UI device indicating a current charge level of the battery. As the battery level decreases over time and with use of the computing system, the UI device may change state so to indicate. For example, the UI device may take the form of a gauge, a bar device, or other suitable graphic. In other examples, the perimeter of a primary display screen (e.g., 210 in FIG. 2) may change to red as the battery life decreases. In response to any of these prompts, the user may choose to transition the computing system manually to mobile mode.

After the computing system is transitioned to mobile mode, the UI device may continue to provide the current status of the battery. When the battery reaches a discharged state, the computing system may prompt the user to recharge the battery.

Block 330 is carried forward from FIG. 3 for further elaboration. As described above, block 330 represents determining whether the computing system is to transition from mobile mode to full power mode. As represented in block 410, the computing system may transition automatically to fill power mode when a power source (e.g., battery 104) has been recharged after, for example, being connected to an AC power source. For example, a lifetime manager component (e.g., 130 and related components in FIGS. 1 and 2) may specify a battery recharge level at which the transition to full power mode occurs.

Additionally, the lifetime manager component may transition the system to full power mode in response to one or more stimuli received while in mobile mode from sources external to the system. Examples of such external stimuli may include receipt of an email, receipt of a signal from a GPS location system, or the like. Other preset external stimuli may also trigger a transition, such as detecting the presence of the user, using an RFID tag for example, or detecting a Wi-Fi hotspot.

In some cases, a user may alter or specify this battery level, such that the computing system transitions automatically to full power mode at the specified battery level. Generally, to maximize battery life, the lifetime manager component may enable the user to keep the device in the low-power or mobile mode as much as possible, considering a current given usage scenario. Additionally, the mobile or low-power mode may provide advantages beyond low power consumption. Examples of such advantages may include faster performance or speed, ease to use, access to different user scenarios through installed applications, or the like.

As represented in block 412, a user may choose affirmatively to transition the computing system to a full power mode, and block 412 may include receiving an indication of such a selection. For example, the user may have the computing system in mobile mode, but then wish to perform some operation that is not accessible in mobile mode. In this case, the user may transition the computing system to full power mode to perform the desired operation.

In describing the process flows 300 and 400 in FIGS. 3 and 4, it is noted that these processes may be performed any number of times as the computing system is booted up, run for some period of time, and shut down.

CONCLUSION

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. A hybrid operating system (OS) stored on a computer-readable storage media comprising:
    a full-power OS component stored on a computer-readable storage media and executed on a full-power processor for enabling a computing system to operate in a full power mode, in which the computing system consumes a first amount of electrical power;
    a low-power OS component stored on a computer-readable storage media and executed on a low-power processor for enabling the computing system to operate in a low-power mode, in which the computing system consumes a lesser amount of electrical power, relative to the first amount;
    a lifetime manager coupled to communicate with the low-power OS component and the full-power OS component, wherein the lifetime manager is operative to transition the computing system between the low-power mode and the full-power mode in response to at least one stimulus received from over a network; and
    a set of core functions executable by the low-power processor and a set of dormant non-core functions executable by the full-power processor, a particular one of the set of dormant non-core functions being activated when the hybrid operating system requests capabilities beyond the set of core functions and the activated non-core function being deactivated when the request is satisfied.

2. The hybrid operating system of claim 1, wherein the lifetime manager is adapted to transition the computing system between the full-power mode and the low-power mode in response to detecting that a battery powering the computing system has reached a predetermined level of charge.

3. The hybrid operating system of claim 1, wherein the lifetime manager is adapted to transition the computing system between the full-power mode and the low-power mode in response to receiving a user-command.

4. The hybrid operating system of claim 1, wherein the low-power OS component includes throttling logic for transitioning between a standard display and an auxiliary display, as provided by the computing system.

5. The hybrid operating system of claim 1, wherein the full-power OS component includes a user interface enabling user-access to the low-power OS component from within the full-power OS component.

6. A computing system comprising at least the hybrid operating system of claim 1.

7. The hybrid operating system of claim 1, further comprising a synchronization component that is adapted for filtering data, settings, or application state passed between the full-power OS component and the low-power OS component.

8. The hybrid operating system of claim 1, further comprising a low power system memory for use only by the low-power processor and a high-power system memory for use only by the full-power processor.

9. The hybrid operating system of claim 1, wherein the lifetime manager powers-down full-power peripherals and/or full-power components and/or the full-power processor while in low power mode.

10. A computing system comprising:
    a full-power core processor having a power consumption characteristic;
    a full-power operating system stored in a computer-readable media and executing on the full-power core processor;
    a low-power core processor having a further power consumption characteristic that is less than the power consumption characteristic of the full-power processor;
    a low-power operating system stored in a computer-readable media and executing on the low-power core processor;
    a lifetime manager adapted to activate the low-power core processor when the computing system is to operate in a low-power consumption mode, and to activate the full-power core processor when the computing system is to operate in a high-power consumption mode, wherein the lifetime manager is adapted to transition the computing system between the full-power core processor and the low-power core processor in response to a stimulus received over a network; and
    a set of core functions executable by the low-power core processor and a set of dormant non-core functions executable by the full-power core processor, a particular one of the set of dormant non-core functions being activated when the computing system requests capabilities beyond the set of core functions and the activated non-core function being deactivated and becoming dormant when the request is satisfied.

11. The computing system of claim 10, wherein the full-power core processor and the low-power core processor reside on separate dies.

12. The computing system of claim 10, further comprising a storage element that includes a low-power consumption component coupled to the low-power core processor and at least a high-power consumption component coupled to the full-power core processor.

13. The computing system of claim 12, further comprising a synchronization component that is adapted for filtering data, settings, or application state passed between the high-power consumption component and the low-power consumption component.

14. The computing system of claim 10, further comprising a display component that includes a standard display coupled to communicate at least with the full-power core processor, and at least an auxiliary display coupled to communicate with the low-power core processor.

15. The computing system of claim 10, further comprising a shared memory coupled to communicate with the full-power core processor and the low-power core processor.

16. The computing system of claim 10, wherein the lifetime manager is adapted to transition the computing system between the full-power core processor and the low-power core processor in response to a charge level of a battery.

17. The computing system of claim 10, wherein the full-power processor uses a full-power graphics processing unit and the low-power core processor uses a low-power graphics processing unit.

* * * * *